United States Patent
Hwang et al.

(10) Patent No.: US 11,130,853 B2
(45) Date of Patent: Sep. 28, 2021

(54) POLYPROPYLENE COMPOSITE RESIN COMPOSITION INCLUDING SILYATED MICROFIBRILLATED CELLULOSE AND VEHICLE PILLAR TRIM USING THE SAME

(71) Applicants: Hyundai Motor Company, Seoul (KR); Kia Motors Corporation, Seoul (KR); Research & Business Foundation Sungkyunkwan University, Gyeonggi-do (KR)

(72) Inventors: Jin Ho Hwang, Seoul (KR); Dae Ig Jung, Gyeonggi-do (KR); Seung Hyeok Chang, Gyeonggi-do (KR); Min Ho Cho, Gyeonggi-do (KR); Sung Hoon Kim, Gyeonggi-do (KR); Jae Do Nam, Seoul (KR)

(73) Assignees: Hyundai Motor Company, Seoul (KR); Kia Motors Corporation, Seoul (KR); Research & Business Foundation Sungkyunkwan University, Gyeonggi-do (KR)

( * ) Notice: Subject to any disclaimer, the term of this patent is extended or adjusted under 35 U.S.C. 154(b) by 210 days.

(21) Appl. No.: 16/033,562

(22) Filed: Jul. 12, 2018

(65) Prior Publication Data

US 2019/0177521 A1    Jun. 13, 2019

(30) Foreign Application Priority Data

Dec. 11, 2017 (KR) .................. 10-2017-0169727

(51) Int. Cl.
*B32B 27/32* (2006.01)
*C08L 23/14* (2006.01)
(Continued)

(52) U.S. Cl.
CPC ........ *C08L 23/142* (2013.01); *B29C 45/0001* (2013.01); *B29C 45/0005* (2013.01);
(Continued)

(58) Field of Classification Search
CPC ............... B32B 23/02; B32B 2262/06; B32B 2262/062; B32B 2262/065; C08F 10/06;
(Continued)

(56) References Cited

U.S. PATENT DOCUMENTS

2010/0190891 A1 * 7/2010 Eichinger ............... C08L 23/10
                                                                    524/35
2013/0096236 A1    4/2013 Bernaerts et al.
(Continued)

FOREIGN PATENT DOCUMENTS

| KR | 10-2015-0071905 A | 6/2015 | |
|----|-------------------|--------|---|
| KR | 10-2015-0072558 A | 6/2015 | |
| WO | WO-2015005239 A1 * | 1/2015 | ............... C08K 7/02 |

*Primary Examiner* — Zachary M Davis
(74) *Attorney, Agent, or Firm* — Mintz Levin Cohn Ferris Glovsky and Popeo, P.C.; Peter F. Corless

(57) ABSTRACT

The present invention relates to a cellulose-containing polypropylene composite resin which is environmentally friendly, and can reduce emission of carbon dioxide and contribute to improvement in fuel efficiency, based on reduced vehicle weight, and a vehicle thin film pillar trim including the same.

10 Claims, 4 Drawing Sheets microfibrillated cellulose

R: methyl group R': 3-methacryloyloxypropyl (51) Int. Cl.
*B29C 45/00* (2006.01)
*B29K 23/00* (2006.01)
*B29K 201/00* (2006.01)
*B29K 419/00* (2006.01)
*B29L 31/30* (2006.01)

(52) U.S. Cl.
CPC ...... *B29K 2023/12* (2013.01); *B29K 2201/00* (2013.01); *B29K 2419/00* (2013.01); *B29K 2995/0017* (2013.01); *B29K 2995/0077* (2013.01); *B29K 2995/0089* (2013.01); *B29L 2031/3041* (2013.01); *C08L 2205/025* (2013.01); *C08L 2205/03* (2013.01); *C08L 2205/035* (2013.01); *C08L 2205/16* (2013.01)

(58) Field of Classification Search
CPC ...... C08F 110/06; C08F 210/06; C08L 23/10; C08L 23/12; C08L 23/14; C08L 23/142; C08L 23/145; C08L 23/147; C08L 23/16
See application file for complete search history.

(56) References Cited

U.S. PATENT DOCUMENTS

2016/0376430 A1* 12/2016 Kusumoto .............. C08L 51/06
  524/494
2017/0218188 A1  8/2017 Kozawa et al.
2017/0334105 A1  11/2017 Mikami et al.

* cited by examiner

FIG. 1

CNF dispersion and MFC powder

POLYPROPYLENE COMPOSITE RESIN COMPOSITION INCLUDING SILYATED MICROFIBRILLATED CELLULOSE AND VEHICLE PILLAR TRIM USING THE SAME

CROSS-REFERENCE TO RELATED APPLICATION

This application claims, under 35 U.S.C. § 119(a), the benefit of priority to Korean Patent Application No. 10-2017-0169727 filed on Dec. 11, 2017, the entire contents of which are incorporated herein by reference.

TECHNICAL FIELD

The present invention relates to a polypropylene composite resin containing a biomaterial such as cellulose and a vehicle interior material including the same. In addition, the present invention relates to molding of a thin film pillar trim from a polypropylene composite resin which exhibits improved fuel-efficiency through reduction of material weight as well as environmental friendliness by including silylated microfibrillated cellulose with improved thermal stability and polypropylene and a predetermined amount of ethylene-octene copolymer elastomer as a rubber elastomer in order to enhance impact strength.

BACKGROUND

Cellulose is the most abundant natural polymer among organic compounds and is not only obtained from recyclable materials but also has biodegradability. For example, cellulose may be decomposed in the soil and returned to nature when discarded, unlike general petroleum synthetic polymers. As environmental problems have become serious globally, for example, the UN Paris Agreement, the automobile industry has an increased need for parts made of environmentally friendly polymer materials.

A pillar trim is a built-in plastic injection element in the middle of the door and the ceiling in a vehicle and a device that functions to enhance indoor appearance and protect the passenger's head in the event of car collisions. The pillar trim may require weight reduction, shock absorption and heat insulation stability. In the case of luxury cars, a pillar trim surrounds the skin as well. In the related art, the pillar trim has been produced by injection molding using polypropylene. A polypropylene resin has been widely used for automobile parts due to its benefits such as excellent moldability, impact resistance and chemical resistance, low specific gravity and low cost.

Automotive parts including environmentally friendly materials have been researched and applied by many automobile companies. These parts may be mainly applied to concept cars, some hybrid vehicles and electric vehicles, but their applications are expected to gradually extend in the future vehicles. Cellulose-containing composite resins may include increased amount of biomass and non-food resources, and the cellulose-containing composite resins may be developed into automobile parts.

Figure 1:
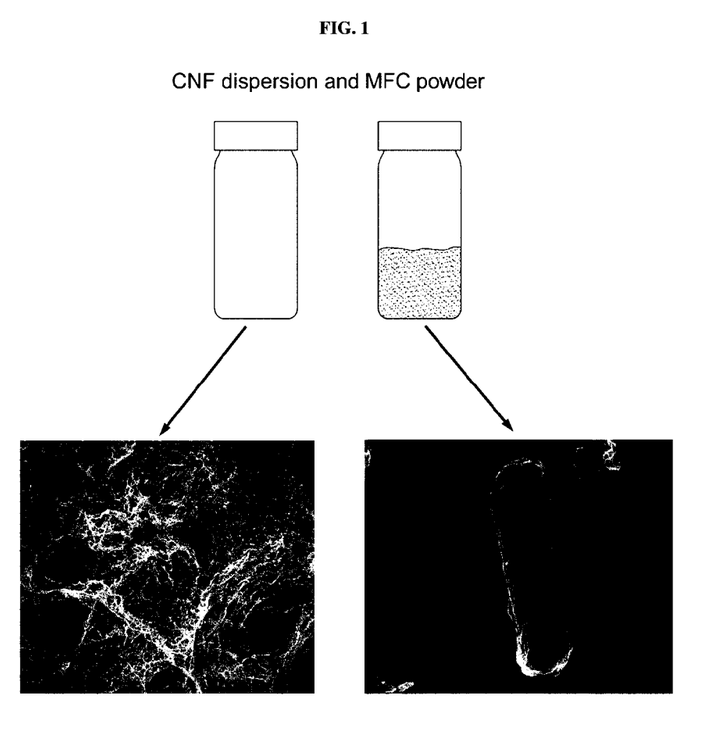
FIG. 1 is an image showing a nano-scale cellulose nanofiber (CNF) dispersion and a micro-scale microfibrillated cellulose (MFC) powder.

In South Korea, research on nano-scale cellulose nanofibers (CNFs) has been underway, but the research is at a basic stage. For instance, cellulose nanofibers may be produced in the form of CNF dispersions used for production of optical films, which may not be suitable for manufacture of composite materials for injection-molding. In the related art, micro fibrillated cellulose (MFC) powder has been manufactured, which may be applicable to the manufacture of composite materials for injection molding. MFC may be suitable for manufacturing injection-moldable composite materials, than CNF. Although nano-scale particles have high surface energy and enable a high amount of filler to be added to the polymer matrix due to the agglomeration phenomenon. Micro-scale MFC may be easy to handle and can be added in higher amounts than nano-scale particles to the polymer matrix. Therefore, micro-scale MFC may be suitable as cellulose for injection-molded products (see FIG. 1). However, MFC does not have sufficient mechanical or chemical properties to replace currently used PP as well. The above information disclosed in this Background section is provided only for enhancement of understanding of the background of the invention and therefore it may contain information that does not form the prior art that is already known in this country to a person of ordinary skill in the art.

SUMMARY OF THE DISCLOSURE

In preferred aspects, the present invention provides a vehicle interior material, for example, thin film pillar trims using environmentally friendly polypropylene composite resins that may include an ethylene-octene copolymer elastomer as a rubber elastomer, a polypropylene composite resin, and a microfibrillated cellulose having improved thermal stability and compatibility with polypropylene. Accordingly, the vehicle interior material may be environmentally friendly, carbon dioxide emission may be reduced and fuel efficiency may be improved due to reduction of vehicle weight.

In one aspect, provided is a polypropylene composite resin which is environmentally friendly and can reduce emission of carbon dioxide and contribute to improvement in fuel efficiency, based on reduced weight of vehicles, and a vehicle thin film pillar trim including the same. Preferably, the polypropylene composite resin may include cellulose.

The polypropylene composite resin composition may include: an amount of about 65% by weight to 85% by weight of polypropylene resin, an amount of about 8% by weight to 22% by weight of microfibrillated cellulose, and an amount of about 3% by weight to 13% by weight of an ethylene-octene elastomer, all the % by weight are based on the total weight of the composition.

The term "microfibrillated" as used herein refers to being in a form of fibrils having a thickness in nanometer range (e.g., in a range of 1 to 100 nm, 1 to 90 nm, 1 to 80 nm, 1 to 70 nm, 1 to 60 nm, 1 to 50 nm, 1 to 40 nm, 1 to 30 nm, 1 to 20 nm, or 5 to 20 nm) to micrometer range with a wide range of lengths, which may be obtained from native fibers by chemical process thereby giving rise to highly crystalline and rigid nanoparticles. Microfibrillated cellulose (MFC) may be a product based separated from cellulose fibrils such as several raw materials like wood pulp or fiber from perennial plants. The term "silylated" or "silylation" as used herein refers to attaching or introducing a substituted or unsubstituted silicon atom to a molecule such as organic compound.

The term "ethylene-octene elastomer" as used herein refers to a resin including a copolymer of ethylene and octene, optionally with other unsaturated alkylene, for example, copolymer obtainable by polymerizing ethylene and octene.

The polypropylene composite resin may include ethylene-polypropylene copolymer. Preferably, the impact-resistant polypropylene may include an ethylene-polypropylene copolymer.

The term "ethylene-polypropylene elastomer" as used herein refers to a resin including a copolymer of ethylene and polypropylene, optionally with other unsaturated alkylene, for example, copolymer obtainable by polymerizing ethylene and polypropylene.

The polypropylene composite resin may suitably have a melt flow index of about 10 g/10 min to 60 g/10 min (230° C., 2.16 kg). The ethylene-octene copolymer elastomer may be a rubber elastomer and may suitably have a melt flow index of about 4 to 20 g/10 min (190° C., 2.16 kg).

The polypropylene composite resin composition may further include an amount of about 1% by weight to 3% by weight of maleic anhydride-grafted polypropylene based on the total weight of the composition. The maleic anhydride-grafted polypropylene may suitably have a polar group grafted in an amount of 1 to 2 mol %. As understood, a polar group is relatively electronegative or electropositive and typically contains 1, 2, 3 or more heteroatoms such as N, O or S, and/or 1, 2, 3 or more halogen atoms such as 1, 2, 3 or more F, Cl, Br, or I. Exemplary polar groups includes, for example, carboxyl, ester, alkoxy or ether, which may be optionally substituted with halogen atoms.

The polypropylene composite resin composition may suitably have tensile strength in accordance with ASTM D638 of about 23 MPa or greater. The polypropylene composite resin composition may suitably have flexural modulus in accordance with ASTM D790 of about 1,670 MPa or greater. The polypropylene composite resin composition may suitably have impact strength in accordance with ASTM D256 of about 39 J/m or greater. The polypropylene composite resin composition may suitably have heat deflection temperature in accordance with ASTM D648 of about 110° C. or greater.

Further provided herein is a method of manufacturing a vehicle interior material that may include the polypropylene composite resin composition as described herein. The method may include injection molding the polypropylene composite resin composition to form the vehicle interior material. Preferably, the vehicle interior material may be a thin film pillar trim.

Still further provided is a vehicle thin film pillar trim including the polypropylene composite resin composition as described herein. The vehicle thin film pillar trim may be manufactured by injection molding the polypropylene composite resin composition. Preferably, the thin film pillar trim may have a thickness of about 1.8 mm or less.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Description of well-known configurations and functions is omitted if these may make the subject matter of the present invention unclear. As used herein, the term "includes" means that other one or more elements may be present, unless context clearly indicates otherwise.

It should be understood that, in the specification, when the range is referred to regarding a parameter, the parameter encompasses all figures including end points disclosed within the range. For example, the range of "5 to 10" includes figures of 5, 6, 7, 8, 9 and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

Hereinafter, the present invention will be described in detail.

In one aspect, provided is a polypropylene composite resin composition including (A) an amount of about 65% by weight to 85% by weight of polypropylene resin, (B) an amount of about 8% by weight to 22% by weight of microfibrillated cellulose, and (C) an amount of about 3% by weight to 13% by weight of an ethylene-octene elastomer, all the % by weights are based on the total weight of the composition.

The polypropylene resin may be impact-resistant. The polypropylene resin may be included in the resin composition in an amount of not less than 65% by weight and not greater than 85% by weight, with respect to the total weight of the polypropylene composition. When the content of the impact-resistant 62% by weight, the content of the microfibrillated cellulose (S-MFC) may be only polypropylene resin is up to about 25 at which the required impact strength may not be reached. When the content of the impact-resistant polypropylene resin is about 67% by weight, sufficient physical properties may be obtained by suitably controlling the contents of S-MFC and EOR. In addition, when the content of the impact-resistant polypropylene is greater than about 87% by weight, due to lack of EOR content, flexural modulus and impact strength may not reach required levels. When the content of the impact-resistant polypropylene resin is about 82% as well, sufficient physical properties may be obtained by suitably controlling the contents of S-MFC and EOR. Preferably, the polypropylene composite resin composition may include the polypropylene resin in the range from about 65% by weight to about 85% by weight.

The microfibrillated cellulose may be silylated by modifying the surface of microfibrillated cellulose.

Figure 4:
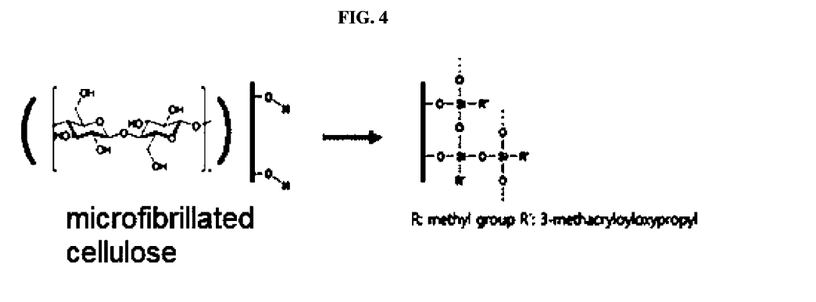
FIG. 4 shows an exemplary scheme for silylating microfibrillated cellulose according to an exemplary embodiment.

The silylated microfibrillated cellulose may be obtained or obtainable from a natural material, as a cellulose derivative. For instance, the microfibrillated cellulose may include a hydroxyl (—OH) group present in a cellulose repeat unit, which may be substituted by condensation with a silane coupling agent, as depicted in FIG. 4.

Figure 2:
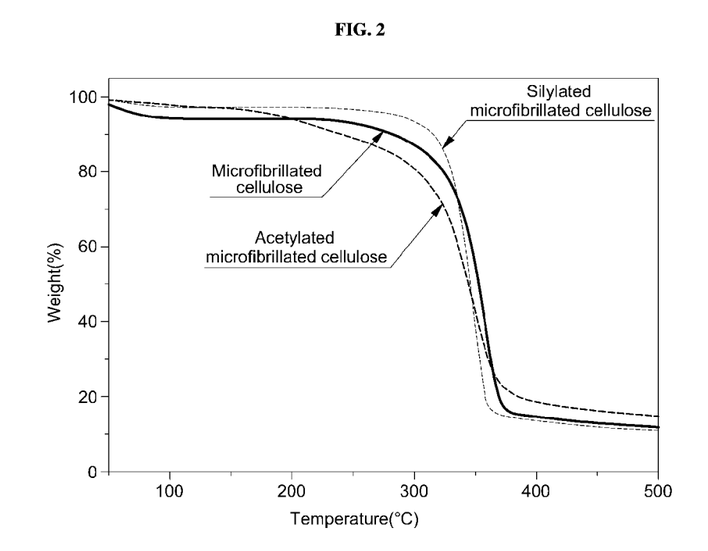
FIG. 2 is a heat deflection curve of various microfibrillated celluloses.

The silylated microfibrillated cellulose may have increased hydrophobicity based on decreased hydroxyl groups on the surface and thus an improved compatibility with polypropylene, so the silylated microfibrillated cellulose may be nonpolar polymer, compared to conventional celluloses. In addition, the silylated microfibrillated cellulose may have thermal decomposition temperature that is 50° C. or greater than a thermal decomposition temperature of pure microfibrillated cellulose and thus high thermal stability, as shown in FIG. 2. Accordingly, the thermal stability of the cellulose-polypropylene composite resin, which is produced by extrusion or injection molding with polypropylene, may be improved. The acetylated microfibrillated cellulose may have deteriorated thermal stability after surface modification due to decrease in hydrogen bonds on the cellulose surface and substitution of acetyl groups with low thermal stability. Preferably, silylated microfibrillated cellulose may be suitably used.

The silylated microfibrillated cellulose (S-MFC), which has improved thermal stability, may be used for extrusion and injection processes for the purpose of applications to vehicle thin film pillar trims. The polypropylene composite resin may include the silylated microfibrillated cellulose in an amount of not less than about 5% by weight and not greater than 25% by weight, based on the total weight of the polypropylene composite resin. When S-MFC is used in an amount of less than about 8% by weight, it is considered to be meaningless as an environmentally friendly composite material, and when S-MFC is used greater than 22% by weight, required impact strength may not be satisfied. Accordingly, S-MFC may be suitably used within this range from about 8% by weight to about 22%. More preferably, the silylated microfibrillated cellulose may be used in an amount of 10% by weight to 20% by weight.

In an embodiment of the present invention, the ethylene-octene elastomer (EOR), as a rubber elastomer (C), may be as an impact reinforcing material which may reinforce impact strength of the polypropylene resin. The ethylene-octene elastomer may be preferably used in an amount of not less than about 3% by weight and not greater than about 13% by weight, with respect to the total weight of the polypropylene resin composition. When the ethylene-octene elastomer is present in an amount of less than about 3% by weight, required properties of flexural modulus and impact strength may not be satisfied, and when the ethylene-octene elastomer is present in an amount greater than about 13% by weight, problems of deterioration in tensile strength and scratch resistance may occur. For this reason, the ethylene-octene elastomer may be preferably used within the range from about 3% by weight to about 13% by weight. Preferably, the ethylene-octene elastomer (EOR) may be used in an amount of not less than about 5% by weight and not greater than about 10% by weight.

The impact-resistant polypropylene(A) may be an ethylene-polypropylene copolymer and may have a melt flow index of about 10 g/10 min to 60 g/10 min (230° C., 2.16 kg). When the melt flow index of the impact-resistant polypropylene isles than about 10 g/10 min, moldability of the resin may be deteriorated. When the melt flow index is greater than about 60 g/10 min, impact strength and mechanical strength such as stiffness of the polypropylene resin may be decreased and may not be used for a vehicle thin film pillar trim material.

The rubber elastomer (C) including the ethylene-octene copolymer elastomer may be a melt flow index of about 4 to 20 g/10 min (190° C., 2.16 kg). When the melt flow index is less than about 4 g/10 min, appearance defects may occur due to poor moldability. When the melt flow index is greater than about 20 g/10 min, IZOD impact strength may be substantially deteriorated. For this reason, the melt flow index of the ethylene-octene copolymer elastomer may be suitably of about 4 to 20 g/10 min (190° C., 2.16 kg).

The composition may further include an amount of 1% by weight to 3% by weight of maleic anhydride-grafted polypropylene (D). Preferably, the maleic anhydride-grafted polypropylene (D) may include a polar group grafted in an amount of about 1 to 2 mol %.

The maleic anhydride-grafted polypropylene (D) may improve compatibility and adhesion property in the polypropylene resin composition and enhance mutual affinity, thereby improving physical properties. For instance, strong hydrogen bonds between cellulose molecules may promote agglomeration during extrusion and injection of the grafted polypropylene with the polypropylene resin, which may cause deterioration in mechanical and thermal properties of final products. Maleic anhydride-grafted polypropylene may improve interfacial adhesion between the cellulose and the polypropylene resin, thereby improving physical properties of the polypropylene composite resin.

The maleic anhydride-grafted polypropylene may include a polar group grafted in an amount of about 1 to 2 mol %, which is preferably present in an amount of not less than about 1% by weight and not more than about 3% by weight, with respect to the total weight of the polypropylene resin composition. When the content of the grafted polypropylene is less than about 1% by weight, improvement in physical properties may not be expected due to poor adhesion property of the polypropylene resin composition. When the content of the grafted polypropylene is greater than about 3% by weight, physical properties of the polypropylene composite resin may be deteriorated causing by excessive amount of treatment. For this reason, the grafted polypropylene may be included in an amount of about 1 to 2 mol %.

In an embodiment of the present invention, the polypropylene composite resin composition may further include one or more additives, for instance, one selected from the group consisting of flame retardants, lubricants, antioxidants, light stabilizers, release agents, pigments, antistatic agents, antibacterial agents, processing aids, metal deactivators, anti-blooming agents, fluorine anti-dropping agents and combinations thereof, in addition to the ingredients, in order to improve performance and processing properties of molded products.

The polypropylene composite resin composition may have at least one of the following physical properties:

(1) Tensile strength in accordance with ASTM D638 of about 23 MPa or greater;

(2) Flexural modulus in accordance with ASTM D790 of about 1,670 MPa or greater;

(3) Impact strength in accordance with ASTM D256 of about 39 J/m or greater; and (4) Heat deflection temperature in accordance with ASTM D648 of about 110° C. or greater.

The polypropylene composite resin composition as described herein may be used for a vehicle interior material produced by injection molding. Preferably, the vehicle interior material may be a thin film pillar trim.

Further provided is a method of preparing the vehicle interior material by injection molding of the polypropylene composite resin composition as described herein.

In another aspect, the present invention provides a vehicle thin film pillar trim manufactured by injection-molding the polypropylene composite resin composition as described herein.

as Accordingly, the present invention may provide an environmentally friendly vehicle interior material, an environmentally friendly vehicle thin film pillar trim which may be obtained by extruding the composition at a processing temperature, for instance of about 190 to 210° C. to produce a pellet and injection-molding the pellet.

The thin film pillar trim may have a thickness of about 1.8 mm or less. The thin film pillar trim preferably may have a thickness of about 1.3 mm to 1.7 mm.

Hereinafter, the present invention will be described in more detail with reference to the following Test Example and Examples. However, the Test example and Examples are provided only for illustration of the present invention and should not be construed as limiting the range of the present invention.

EXAMPLE

Examples 1 to 4 and Comparative Examples 1 to 13

The polypropylene composite resin composition was prepared by mixing ingredients in accordance with the composition ratio shown in the following Table 1 at room temperature for 5 minutes, and the composition was dry-blended and then extruded using a twin-screw extruder at a temperature of 180° C. and to a screw rotation speed of 150 rpm (manufacturer: BAU, diameter: 19) to produce a pellet. Specimens for measuring physical properties of Examples 1 to 4 were injected using the composition of the pellet at a temperature of 190° C. using an injection molding machine (manufacturer: Engel, die clamping force: 45 ton). The polypropylene composite resin was introduced into an injection mold at an injection rate of 85 mm/s and at a packing pressure of 3 bar through an injection gate, and polypropylene bio-composite resin specimens for measuring physical properties and polypropylene bio-composite resin specimens for evaluation of appearance were produced at a die temperature of 60° C. for a cooling time of 15 seconds.

Specimens for measuring physical properties and specimens for evaluating appearance according to Comparative Examples 1 to 12 were produced in accordance with the composition ratios shown in the following Table 1 in the same manner as in Examples 1 to 4.

Test Example: Measurement of Physical Properties

Specimens for measuring physical properties and specimens for evaluating appearance according to Examples 1 to 4 and Comparative Examples 1 to 12 were subjected to measurement of physical properties by the following method and measured physical properties are shown in the following Table 3.

Results of physical properties shown in Table 3 are expressed as means of five physical property figures, excluding the upper and lower figures, and the test method is as follows.

1) Tensile strength: tested in accordance with ASTM D638. The specimen was Type 1 and test rate was 50 mm/min. The used measurement equipment was a UTM from INSTRON Corporation.

2) Flexural modulus: tested in accordance with ASTM D790. The specimen size was 127 mm×12.7 mm×6.4 mm and the rate was 30 mm/min. The used measurement equipment was a UTM from INSTRON Corporation.

3) Impact strength: tested in accordance with ASTM D256. The specimen size was 63.5 mm×12.7 mm×6.4 mm and a notched specimen was used. Impact strength was measured at room temperature (25° C.). The used measurement equipment was an IZOD impact testing machine from Tio Korea Co., Ltd.

4) Heat deflection temperature: tested in accordance with ASTM D648. The specimen size was 127 mm×12.7 mm×6.4 mm and the load was 0.45 MPa. The used measurement equipment was a heat deflection testing machine from Instron Corporation.

The following physical properties should meet the requirements shown in the following Table 2 for use as a vehicle thin film pillar trim material. If any one item does not meet the requirement, the specimen cannot be used as a vehicle thin film pillar trim material due to problems occurring when using a product after molding the product. Such a specimen is determined to "fail".

TABLE 2

| | Types | |
|---|---|---|
| Items | Required properties | Unit |
| Tensile strength | 24 or more | MPa |
| Flexural modulus | 1,670 or more | MPa |
| Impact strength | 39 or more | J/m |
| Heat deflection temperature | 110 or more | ° C. |

TABLE 1

| Items | | Examples | | | | Comparative Examples | | | | | | | | | | | | |
|---|---|---|---|---|---|---|---|---|---|---|---|---|---|---|---|---|---|---|
| Materials | | 1 | 2 | 3 | 4 | 1 | 2 | 3 | 4 | 5 | 6 | 7 | 8 | 9 | 10 | 11 | 12 | 13 |
| PP | Co-PP[1] | 82 | 77 | 72 | 67 | 87 | 77 | 67 | 87 | 77 | 67 | 84 | 80 | 77 | 72 | 87 | 62 | 72 |
| Filler | MFC[2] | — | — | — | — | — | — | — | 10 | 20 | 30 | — | — | 10 | 10 | — | — | — |
| | S-MFC | 10 | 10 | 20 | 20 | 10 | 20 | 30 | — | — | — | 10 | 10 | — | 10 | 5 | 25 | 10 |
| Rubber | EOR[3] | 5 | 10 | 5 | 10 | — | — | — | — | — | — | 5 | 5 | 10 | 5 | 5 | 10 | 15 |
| | MA-g-PP | 2 | 2 | 2 | 2 | 2 | 2 | 2 | 2 | 2 | 2 | — | 4 | 2 | 2 | 2 | 2 | 2 |
| | Other stabilizers[4] | 1 | 1 | 1 | 1 | 1 | 1 | 1 | 1 | 1 | 1 | 1 | 1 | 1 | 1 | 1 | 1 | 1 |
| Total | | 100 | 100 | 100 | 100 | 100 | 100 | 100 | 100 | 100 | 100 | 100 | 100 | 100 | 100 | 100 | 100 | 100 |

[1]Melt index (230° C., 2.16 kg) 30 g/10 min
[2]Minimum volume density 0.4 g/cc, Mean particle size 24 μm
[3]EOR: LG Chem, Ltd. Grade: LC670, melt index (190° C., 2.16 kg) 5 g/10 min
[4]Other stabilizers: UV stabilizer, heat-resistant stabilizer, lubricant or the like TABLE 2-continued

| | Types | |
|---|---|---|
| Items | Required properties | Unit |
| Appearance (requiring 10% by weight or more of environmentally friendly material) | Good | — |

TABLE 3

|  | Examples | | | | Comparative Examples | | | | |
|---|---|---|---|---|---|---|---|---|---|
| Items | 1 | 2 | 3 | 4 | 1 | 2 | 3 | 4 | 5 |
| Tensile strength | 25 | 24 | 26 | 25 | 31 | 29 | 30 | 29 | 27 |
| Flexural modulus | 1,932 | 1,781 | 2,279 | 2,096 | 1,300 | 1,550 | 1,930 | 1,380 | 1,580 |
| Impact strength | 49 | 64 | 40 | 39 | 37 | 30 | 26 | 35 | 25 |
| Heat deflection temperature | 121 | 116 | 134 | 127 | 122 | 135 | 143 | 122 | 132 |
| Appearance Pass/fail | Pass Pass | Pass Pass | Pass Pass | Pass Pass | Pass Fail | Pass Fail | Pass Fail | Fail Fail | Fail Fail |

|  | Comparative Examples | | | | | | | |
|---|---|---|---|---|---|---|---|---|
| Items | 6 | 7 | 8 | 9 | 10 | 11 | 12 | 13 |
| Tensile strength | 25 | 24 | 24 | 24 | 25 | 26 | 28 | 21 |
| Flexural modulus | 1,950 | 1,663 | 1,695 | 1,996 | 2,018 | 1,581 | 1,898 | 2,148 |
| Impact strength | 24 | 38 | 38 | 46 | 39 | 48 | 35 | 55 |
| Heat deflection temperature | 136 | 121 | 118 | 121 | 133 | 115 | 129 | 120 |
| Appearance Pass/fail | Fail Fail | Pass Fail | Pass Fail | Fail Fail | Fail Fail | Pass Fail | Pass Fail | Pass Fail |

The results of Table 3 show that polypropylene biocomposite resins of Examples 1 to 4 satisfied all required properties in terms of tensile strength, flexural modulus, impact strength, heat deflection temperature and appearance.

Meanwhile, in Comparative Examples 1 to 3 wherein only silylated microfibrillated celluloses were used, impact strength (Comparative Examples 1 to 3) and flexural modulus (Comparative Example 1) could not be satisfied due to brittleness of the produced polypropylene composite resins. In Comparative Examples 4 to 6 wherein only non-surface-modified fibrillated celluloses were used, impact strength (Comparative Examples 4 to 6), appearance (Comparative Examples 4 to 6) and flexural modulus (Comparative Examples 4) could be not satisfied. In Comparative Example 7 wherein maleic anhydride-grafted polypropylene was not used, impact strength was not satisfied due to deterioration in compatibility, and in Comparative Example 8 including maleic anhydride-grafted polypropylene in an amount of 4% by weight, the impact strength requirement was not satisfied.

Comparative Examples 9 to 10 satisfied required mechanical/physical properties of tensile strength, flexural modulus, impact strength and heat deflection temperature, but have bad appearance due to non-surface-modified fibrillated cellulose, and Comparative Example 11 satisfied mechanical/physical properties, but was unsuitable as a material for environmentally friendly vehicle thin film pillar trims because microfibrillated cellulose, as an environmentally friendly material, was used in an amount of 5% by weight. Comparative Example 12 including 25% by weight of silylated microfibrillated cellulose was disadvantageous in securing impact strength. In Comparative Example 13 including rubber elastomer in an amount of 15% by weight, the tensile strength requirement was not satisfied.

Production Example (Thin Film Pillar Trims for Vehicles)

A thin film pillar trim for vehicles was injected using the polypropylene composite resin of Example 1 at a temperature of 200° C. using an injection molding machine (manufacturer: LG Mtron, die clamping force: 650 ton).

Figure 3:
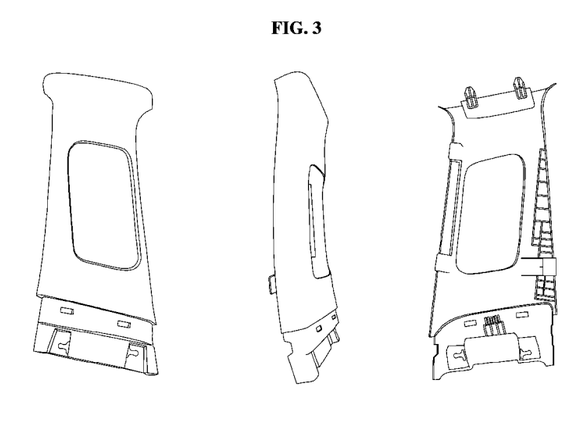
FIG. 3 is an image showing an exemplary thin film pillar trim including an exemplary polypropylene composite resin containing 10% by weight of microfibrillated cellulose of Example 1 in Production Example according to an exemplary embodiment of the present invention.

FIG. 3 is an image showing a thin film pillar trim specimen of a polypropylene composite resin containing 10% by weight of microfibrillated cellulose as a biomaterial in Example 1. As can be seen from FIG. 3, the polypropylene composite resin was useful as a thin film (thickness: 1.5 mm) pillar trim material among vehicle interior materials.

Preferably, the polypropylene composite resin composition according to one embodiment of the present invention has a tensile strength in accordance with ASTM D638 of about 23 MPa or greater. The polypropylene composite resin composition may have a flexural modulus in accordance with ASTM D790 of about 1,670 MPa or greater. The polypropylene composite resin composition may have an impact strength in accordance with ASTM D256 of about 39 J/m or greater.

The polypropylene composite resin composition according to one embodiment of the present invention has a heat deflection temperature in accordance with ASTM D648 of about 110° C. or greater.

The polypropylene composite resin composition may have all required properties including a tensile strength in accordance with ASTM D638, of about 23 MPa or more, a flexural modulus in accordance with ASTM D790 of about 1,670 MPa or greater, an impact strength in accordance with ASTM D256 of about 39 Jim or greater, and a heat deflection temperature in accordance with ASTM D648 of about 110° C. or greater.

During manufacture of the thin film pillar trim for vehicles according to another embodiment of the present invention, a part of raw materials for polypropylene may include cellulose which is an environmentally friendly material.

The thin film pillar trim for vehicles may cost less than thin film pillar trims using carbon fibers and cellulose diacetate (CDA) by using an environmentally friendly composite resin using cellulose fibers and may reduce emission of carbon dioxide due to decrease in amount of polypropylene used.

Moreover, the thin film pillar trim for vehicles may contribute to the improvement of fuel efficiency based on reduced weight of vehicles by decreasing the thickness of the pillar trim by about 25% or greater to about 1.5 mm, from 2.0 to 2.3 mm, which is the thickness of conventional pillar trims.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A polypropylene composite resin composition comprising:
   an amount of about 65% by weight to 85% by weight of a polypropylene resin;
   an amount of about 10% by weight to 20% by weight of microfibrillated cellulose;
   an amount of about 3% by weight to 13% by weight of an ethylene-octene elastomer; and
   an amount of about 1% by weight to 3% by weight of maleic anhydride-grafted polypropylene wherein the maleic anhydride-grafted polypropylene has a polar group gafted in an amount of 1 to 2 mol %,
   wherein all the % by weight are based on the total weight of the composition, wherein the microfibrillated cellulose is silylated, and
   wherein the composition does not comprise non-surface-modified microfibrillated cellulose.

2. The polypropylene composite resin composition according to claim 1, wherein the polypropylene comprises an ethylene-polypropylene compolymer.

3. The polypropylene composite resin composition according to claim 1, wherein the polypropylene has a melt flow index of about 10 g/10 min to 60 g/10 min (230° C., 2.16 kg).

4. The polypropylene composite resin composition according to claim 1, wherein the ethylene-octene copolymer elastomer has a melt flow index of about 4 to 20 g/10 min (190° C., 2.16 kg).

5. The polypropylene composite resin composition according to claim 1, wherein the polypropylene composite resin composition has tensile strength in accordance with ASTM D638 of about 23 MPa or greater.

6. The polypropylene composite resin composition according to claim 1, wherein the polypropylene composite resin composition has flexural modulus in accordance with ASTM D790 of about 1,670 MPa or greater.

7. The polypropylene composite resin composition according to claim 1, wherein the polypropylene composite resin composition has impact strength in accordance with ASTM D256 of about 39 Jim or greater.

8. The polypropylene composite resin composition according to claim 1, wherein the polypropylene composite resin composition has heat deflection temperature in accordance with ASTM D648 of about 110° C. or greater.

9. A vehicle thin film pillar trim comprising the polypropylene composite resin composition according to claim 1.

10. The vehicle thin film pillar trim according to claim 9, wherein the thin film pillar trim has a thickness of about 1.8 mm or less.

* * * * *